United States Patent [19]

Minamida et al.

[11] Patent Number: 4,739,846
[45] Date of Patent: Apr. 26, 1988

[54] COUNTING METHOD

[75] Inventors: Kazukiyo Minamida; Yoshiharu Asai, both of Shiga, Japan

[73] Assignee: Kabushiki Kaisha Ishida Koki Seisakusho, Kyoto, Japan

[21] Appl. No.: 375,268
[22] PCT Filed: Sep. 21, 1981
[86] PCT No.: PCT/JP81/00248
  § 371 Date: Apr. 28, 1982
  § 102(e) Date: Apr. 28, 1982
[87] PCT Pub. No.: WO82/01247
  PCT Pub. Date: Apr. 15, 1982

[30] Foreign Application Priority Data

Sep. 25, 1980 [JP] Japan ............... 55-133908

[51] Int. Cl.4 ............... G01G 19/42; G01G 19/22
[52] U.S. Cl. ........................... 177/1; 177/25; 364/567
[58] Field of Search ............ 177/1, 25, 50, 59, 164, 177/199, 200, 25.18, 25.17; 364/567

[56] References Cited

U.S. PATENT DOCUMENTS 4,157,738  6/1979  Nishiguchi ............... 177/1
4,313,507  2/1982  Hays ............... 177/25 X
4,336,853  6/1982  Hirano ............... 177/25
4,344,492  8/1982  Hirano ............... 177/25
4,360,070 11/1982  Hirano ............... 177/25

Primary Examiner—Joseph W. Hartary
Attorney, Agent, or Firm—Armstrong, Nikaido, Marmelstein & Kubovcik

[57] ABSTRACT

A counting method comprising the steps of weighing a number of articles dividedly by n weighing machines, dividing the weights measured by the weighing machines by the unit weight of the articles to find the respective numbers of articles in the weighing machines, calculating combinations of these numbers to find the combination numbers associated with the respective combinations, finding a particular combination whose combination number is equal or closest to a set number, and discharging the groups of articles corresponding to the particular combination from the corresponding weighing machines, while calculating a new unit weight from a weight or weights measured by one or a plurality of the weighing machines and from the number or numbers of articles in this one or plurality of the weighing machines, such new unit weight being used for the next calculation of numbers.

14 Claims, 4 Drawing Sheets

COUNTING METHOD

The present invention relates to a method of counting articles with increased accuracy in combinatorial counting of articles which have variations in the weight of a single article (hereinafter referred to as unit weight), such as packaged cups of bolts, nuts, and milk.

In the case of combinatorial counting which comprises the steps of weighing groups of articles respectively by a plurality of weighing machines, converting the weight measured by each weighing machine into the number of articles in each group, and performing combinatorial calculations of the individual weights to obtain a predetermined number of articles, said conversion of weights into numbers is performed by dividing each measured weight by the unit weight, or the weight of a single article. However, if there is an error in the unit weight, this results in an error in the number of articles calculated for each weighing machine and hence an error in the combination number obtained by performing combinatorial calculations, thus making accurate counting impossible. Further, the greater the number of articles weighed by a single weighing machine, the greater the error in the calculated number. Therefore, in order to calculate the number of articles accurately, it is necessary to find the unit weight accurately. However, since articles vary in the unit weight, as described above, it would be nonsense to weigh a single article accurately for the purpose of finding the unit weight. Thus, it would be better to find the unit weight by weighing a number of articles and dividing their weight by the number of articles; the greater the number of articles to be weighed, the more accurately can the unit weight be ontained. Therefore, it is preferable that the value for the unit weight of articles which is determined by suitable means at the start of weighing operation be replaced by a new value obtained by calculation in each weighing operation. In order to find the unit weight more accurately, there is a method of renewing the unit weight for each weighing operation, which comprises the steps of initially charging each weighing machine with a lesser number of articles and gradually increasing the number of articles to be charged into each weighing machine in successive weighing operations until it corresponds to the number of articles to be obtained. Further, where combinatorial counting is repeated, there are cases where the unit weight of articles gradually decreases (or increases) as a whole with the lapse of time. This occurs, e.g., when milk is charged into cups, because the viscosity of milk varies with ambient temperature. In this case also, it is necessary to calculate the unit weight of articles for renewal in each weighing operation.

Accordingly, it is an object of the present invention to provide more accurate combinatorial counting by calculating the unit weight from the weight or weights of articles weighed by a single or a plurality of weighing machines in each combinatorial operation, to renew the value for the unit weight so as to obtain a more accurate value for the unit weight.

According to the invention, since the unit weight for calculating the number of articles from their weight can be obtained from the weight of a number of articles which is actually calculated, the counting accuracy can be increased. According to the invention, even if the unit weight of articles gradually varies during counting, such variations can be automatically accommodated by renewing the unit weight of articles in each counting operation, so that very accurate counting can be effected. Further, according to the invention, since the unit weight is automatically renewed by weighed articles themselves through combinatorial weighing, the initial setting of unit weight can be very accurately effected, even in the case of weighing a large number of articles, by initially weighing a relatively small number of articles and then gradually increasing the number of articles to be weighed.

A combinatorial counting method has heretofore been known, comprising the steps of charging a plurality of weighing machines each with a number of articles with suitable variations, dividing the weight value of articles obtained by each weighing machine by the unit weight of articles to find the number of articles, calculating combinations of the weights to find a particular combination which is equal or closest to a set number, and discharging the articles from the weighing machines corresponding to said particular combination. Thus, in this counting method, if the unit weight of articles for finding the number of articles from the weighed value of the articles is fixed at the initially set value, there is a possibility that the error in this set unit weight increases with respect to the unit weight of the articles which are to be actually weighed. This is because the value used for initially setting the unit weight of articles is either a value obtained by weighing usually a single or several articles by a separate weighing machine or a value which is preset as the standard weight of such article. Since the unit weight of articles will differ from article to article or vary with such factors as the conditions of the machine used for producing such articles and the quality of the material of the articles, even if efforts are being made to keep the unit weight of articles at a fixed value, the unit weight will vary with the lapse of time. Therefore, it is more preferable that the unit weight used in said combinatorial counting be obtained from the weighed value of a number of articles being actually weighed, by dividing said value by the number of articles.

With the above in mind, the present invention provides improvements. More particularly, the invention consists in weighing a large number of articles by n weighing machines, dividing the weight measured by each weighing machine by the unit weight to find the number of articles contained in each weighing machine, calculating combinations of the individual numbers to find a particular combination which is equal or closest to a set weight, while calculating a new unit weight from the weight or weights measured by one or a plurality of said weighing machines and from the number or numbers of articles contained in said weighing machine or machines, and using this new unit weight for the next calculation of numbers.

The invention has many embodiments as to the method of finding a new unit weight after combinatorial counting. These embodiments will be suitably selectively used singly or in combinations, depending upon the kind of articles to be counted or upon the purpose of counting.

Thus, in a counting method comprising the steps of dividing the weighed values of articles obtained by a plurality of weighing machines by the unit weight to find the numbers, and calculating combinations of these numbers to find a particular combination equal or closest to a set number, the invention consists in dividing the weighed value of the actually weighed articles by the number of said articles to find the unit weight, the latter being then used as a new unit weight for the next combinatorial counting, so that combinatorial counting can be performed with very high accuracy. Further, even if the average unit weight of articles gradually varies during repeated combinatorial counting, this is automatically compensated to allow combinatorial counting to be effected with the proper unit weight at all times.

These and other objects and features of the invention will become more apparent from the following description given with reference to the accompanying drawings, in which.

Figure 1:
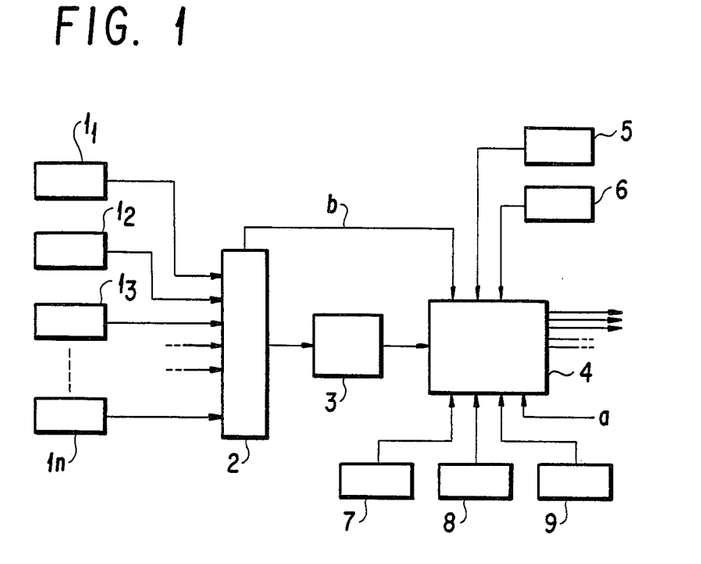
FIG. 1 is a block diagram showing an example of the arrangement of the present invention.
Figure 2:
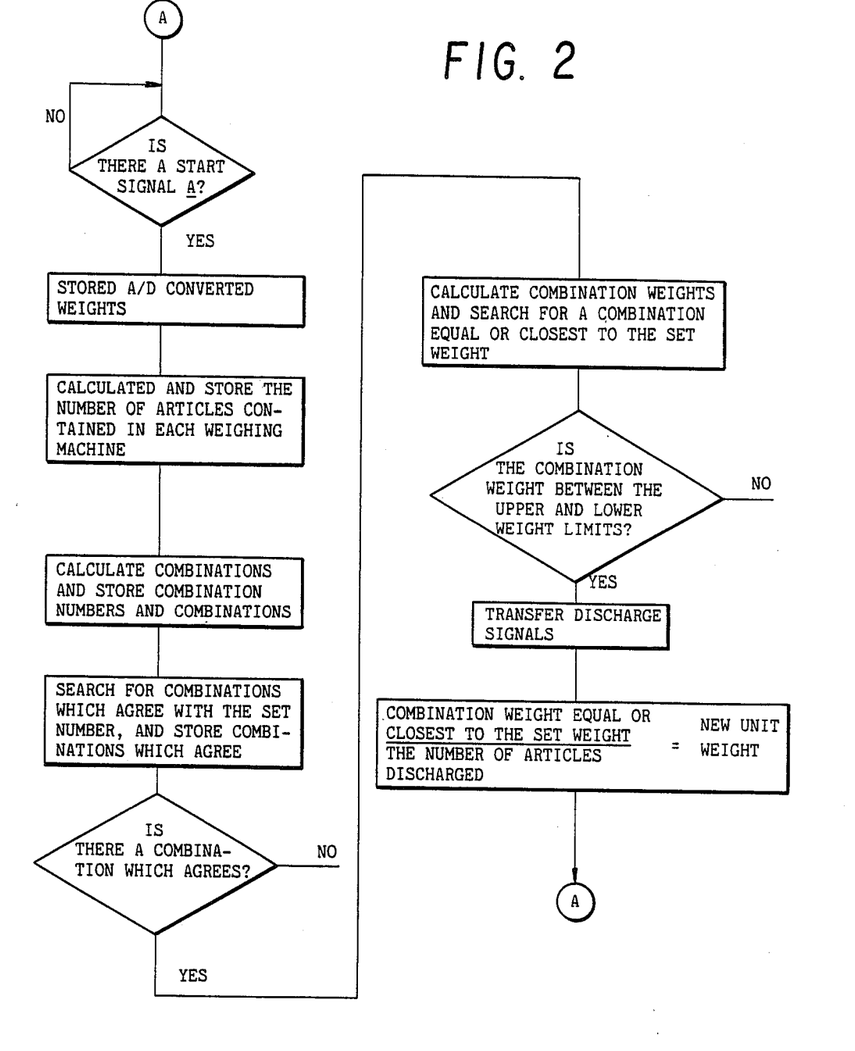
FIGS. 2 through 4 are flowcharts showing different examples of the processing procedure in the example of the arrangement in FIG. 1.

In FIG. 1 showing a combinatorial counting apparatus according to the present invention using a microcomputer, $1_1 \ldots 1_n$ denote n weighing machines for weighing articles, and 2 denote a multiplexer for successively transferring analog weight voltages produced by the weighing machines $1_1 \ldots 1_n$ in response to selection signals to be later described, said multiplexer being composed, e.g., of analog switches. The numeral 3 denotes an A/D converter for converting analog weight voltages from the multiplexer 2 into digital weight signals; 4 denotes an arithmetic control section composed of a microcomputer or the like; 5 denotes a unit weight setting section for setting the unit weight of articles; 6 denotes a number setting section for setting the number of articles to be counted; 7 denotes a weight setting section for setting the total weight of that number of articles which has been set by the number setting section 6; 8 denotes an upper weight limit setting section for setting the upper limit weight for the total weight of a set number of articles; and 9 denotes a lower weight limit setting section for setting the lower weight limit. FIG. 2 is a flowchart showing an example of the operation of the arithmetic control section 4, which will now be described.

The n weighing machines $1_1 \ldots 1_n$ have been charged each with a division of a number of articles. When a start signal a from a packaging machine (not shown) for packaging counted articles is transferred to the arithmetic control section 4, the latter transfers a selection signal b to the multiplexer 2. In response to the selection signal, the multiplexer 2 transfers the analog weight voltages, which have been transferred thereto from the weighing machine $1_1 \ldots 1_n$, successively to the A/D converter 3, and the A/D converted weights are stored in the arithmetic control section 4. The arithmetic control section 4 divides each weight stored therein by the unit weight set by the unit weight setting section 5 and rounds the quotient to the nearest integer, thus converting the weights of the articles in the weighing machines $1_1 \ldots 1_n$ into the respective numbers of articles therein and storing said numbers. The arithmetic control section 4 adds the stored numbers of articles in the weighing machines $1_1 \ldots 1_n$ in accordance with all of the combination codes indicating the combinations of the weighing machines to calculate combination numbers for the combination codes, stores these combination numbers and combination codes in pairs, and compares the set number set by the number setting section 6 with all of the stored combination numbers to search for a combination code which agrees in number, and stores it. However, if there is no combination which agrees in number, it judges that counting is impossible, and turns on a warning lamp, for example, moving to a suitable error processing treatment. Further, the arithmetic control section 4 adds the weights of the articles in the weighing machines $1_1 \ldots 1_n$ in accordance with the combination numbers which are equal to the set number of calculate the combination weights and searches for a combination of weights, among these combination weights, which is equal or closest to the set weight set by the weight setting section 7 and stores such combination weight and combination code as a pair. It compares this stored combination weight with the upper weight limit set by the upper weight limit setting section 8 and the lower weight limit set by the lower weight limit setting section 9, and if this combination weight is not between the upper and lower weight limits, it judges that counting is impossible, and turns on a warning lamp, for example, moving to a suitable error processing treatment. If said combination weight lies between the upper and lower weight limits, the arithmetic control section 4 transfers discharge signals in accordance with the combination code associated with said combination weight. The articles in the weighing machines corresponding to the discharge signals are discharged, so that articles whose number is equal to the set number are fed to the packaging machine. At this time, the arithmetic control section 4 calculates a new unit weight from the weight or weights of the articles in a desired one or more of the weighing machines and the number or numbers of articles therein and stores said new unit weight. The new unit weight is used when the numbers of articles are calculated from the weights of the articles in the weighing machines $1_1 \ldots 1_n$ in the next counting. In addition, there are various methods of finding this new unit weight, which will be later described in block.

Thereafter, the next counting operation will be performed in the same manner as described above.

First, the weighing machines from which articles have been discharged are fed with fresh articles and when a start signal a is transferred to the arithmetic control section 4, the weights of articles in the weighing machines $1_1 \ldots 1_n$ are stored in the same manner as in the preceding case. These weights are divided by the new unit weight which was calculated in the preceding counting and stored, the quotients being rounded to the nearest integers, whereby the weights of the articles in the weighing machines $1_1 \ldots 1_n$ are converted to the numbers of articles. As in the preceding case, a combination whose combination number is equal to the set number and whose combination weight lies between the upper and lower weight limits and equal or closest to the set weight is searched for. If a combination which satisfies these conditions is obtained, discharge signals are transferred from the arithmetic control section in accordance with this combination. In this case also, this combination weight which has been discharged is divided by the set weight to calculate a new unit weight, which is stored in place of the new unit weight which was calculated and stored in the preceding counting operation and is used for the next counting operation. Thereafter, the same procedure is followed and the unit weight is renewed for each counting operation.

As described above, the invention consists in calculating the number of articles in each weighing machine by a preset unit weight for the first combinatorial counting, and calculating and storing a new unit weight for the next combinatorial counting, so that in and after the second combinatorial counting, the number of articles in each weighing machine is calculated by the new unit weight calculated and stored during the preceding counting and the new unit weight is renewed for the next counting.

Some concrete methods of finding new unit weights in the above arrangement will now be described.

A first method of finding new unit weights is characterized in that when discharged signals are transferred from the arithmetic control section 4 after combinatorial calculations in accordance with the result of said combinatorial calculations, the arithmethic control section 4 calculates a new unit weight by dividing the weight of the discharged articles, i.e., the combination weight which is equal or closest to the set weight, by the number of discharged articles, i.e., the set number, said new unit weight being stored in the arithmethic control section 4 for use in the next combinatorial calculation.

A second method of finding new unit weights is characterized in that the combination weights in those combinations whose combination numbers are equal to the set number are rearranged in decreasing or increasing order, and one combination weight which is at the middle of the series (i.e., median) is divided by that combination number to find a new unit weight.

The usefulness of this second method will now be described. In the case where the first method is used, if, for example, there are 5 combinations whose combination numbers are equal to the set number and whose combination weights are 199 g, 200 g, 196 g, 197 g, and 194 g, and the set number is 200 g, then the combination whose combination weight is 200 g will be discharged and a new unit weight will be calculated by dividing this combination weight 200 g by the combination number. However, where combination weights are distributed more predominantly in the smaller-value region (or larger-value region) with respect to the set weight, as in this case, a new unit weight can be found more accurately by dividing the combination weight which lies in the middle of the combination weight series (median) (in the above example, 197 g) by the combination number than by dividing the combination weight which is equal or closest to the set weight by the combination number.

In the first and second methods, a new unit weight is calculated from the combination weight in one combination and the combination number in that combination. However, it is possible to calculate a new unit weight from the combination weights in a plurality of combinations and the combination numbers in those combinations and to store said new unit weight. This will now be described as third through sixth methods.

The third method of finding new unit weights comprises the steps of dividing the combination weights in all or any of those combinations whose combination numbers are equal to the set number respectively by said combination number to find unit weights, calculating the average of these unit weights, and storing said average as a new unit weight.

The usefulness of this third method will now be described. Where a plurality of combinations whose combination numbers are equal to the set number are obtained, a combination whose total weight is closest to the set total weight to be discharged is selected from the combinations and the articles are discharged from the corresponding weighing machines. In this case, if a new unit weight is obtained by dividing the total weight of the discharged combination by the set number, errors will become greater when the unit weight is varying. That is, where the unit weight is varying, the total weight in each combination is also varying in the same direction as the unit weight as a whole. In this case, it is better to adopt a way of finding new unit weights which reflects the value of the varying total weight. Therefore, although what is discharged is the combination closest to the set total weight, a new unit weight is found by calculating a unit weight for each of the combinations which are equal to the set number and calculating the average of these unit weights, the new unit weight thus found being close to the average of the actual unit weights, which minimizes the probability of errors in individual calculations.

The fourth method of finding new unit weights will be described. First, the upper and lower limits of the number of articles are provided. Of the calculated and stored combinations and their combination numbers, all or any of those combinations which are equal to the set number are stored, while those combinations whose combination numbers lie between the upper and lower number limits are searched for and all or any of them are stored. The combination weights in these combinations which are stored under the condition of equality or lying between the upper and lower limits are calculated and stored, and the stored combination weights are divided respectively by their combination numbers to provide unit weights, and the average of these unit weights is calculated to provide a new unit weight.

The fifth method of finding new unit weights comprises the steps of calculating combinations, storing all said combinations and combination weights, dividing all the stored combination weights respectively by their combination numbers to provide unit weights, and calculating the average of these unit weights to provide a new unit weight.

The sixth method of finding new unit weights comprises the steps of calculating the sum of individual combination weights, e.g., the combination weights of all or any of those combinations whose combination numbers lie between the upper and lower number limits to provide the total weight, adding up their combination numbers to provide the total number, dividing said calculated total weight by the total number to provide a unit weight, and using said unit weight as a new unit weight.

While the first through sixth methods are based on combination weights, it is also possible to calculate new unit weights with the weight of the articles in each weighing machine taken into account. This will now be described as the seventh through tenth methods.

The seventh method of finding new unit weights comprises the step of dividing the weight of articles measured by a particular one of the weighing machines taking part in combinatorial counting operation by the number of the articles in said particular weighing machine, thus providing a new unit weight. This calculated new unit weight is used in the next combinatorial counting to calculate the number of articles from the weight of articles received in each weighing machine.

The eighth method of finding new unit weights is characterized in that in the seventh method, the one weighing machine used for finding a new unit weight is changed with one selected from the other weighing machines taking part in combinatorial counting in a predetermined order for each counting operation.

The usefulness of the eighth method is the removal of the disadvantage of fixing one weighing machine used for finding new unit weights. More particularly, with said one weighing machine fixed, if the articles in this particular weighing machine are not discharged in a series of operations, this means that the new unit weight is not renewed, failing to represent the unit weight of the present articles.

The nineth method of finding new unit weights comprises the steps of dividing the weights of articles in all or any of the n weighing machines respectively by the numbers of these articles to find unit weights, calculating the average of these unit weights, and storing said average as a new unit weight.

The tenth method of finding new unit weights comprises the steps of calculating the total weight by adding up the weights of articles in all or any of the n weighing machines, calculating the total numbers by adding up the numbers of articles in these weighing machines, and dividing the calculated total weight by the calculated total number to provide a new unit weight.

The eleventh method of finding new unit weights will now be described.

The first through tenth methods of finding new unit weights described above comprise the steps of converting weights found by the weighing machines into numbers, calculating combinations of these numbers, discharging the articles from the weighing machines corresponding to a particular combination which satisfies the conditions, recalculating a unit weight, storing the latter for use as a unit weight for the next combinatorial counting operation. Upon careful examination of the same, it is seen that all of the weights found by the weighing machines are newly stored and divided by the newly stored unit weight to find respective numbers. However, the discharge of articles on the basis of the result of the preceding calculation is not from all of the weighing machines. That is, there are weighing machines in which articles from the preceding combinatorial counting remain without being discharged. However, the next calculation is performed by using the newly stored unit weight for conversion of weights measured by the weighing machines into numbers. As a result, there are weight values not divided by proper unit weight, forming a major cause of errors in calculating the number of articles. To elimnate this drawback, the conversion into numbers by the use of a newly stored unit weight in the next calculation should be limited to those weighing machines which were emptied last time and newly filled with articles. That is, the eleventh method of finding new unit weights is characterized in that for the weighing machines which did not discharge last time, calculation for conversion by the use of the new unit weight is not performed and instead the numbers into which weights were converted last time are stored and used as such for calculation of combinations. If calculation of combinations is performed by the use of the stored numbers, for those weighing machines which have not discharged, until they discharge, the probability that numbers are mistaken because of the factors described above can be minimized. In addition, the eleventh method of finding new unit weights is performed together with any of the first through tenth methods.

Figure 3:
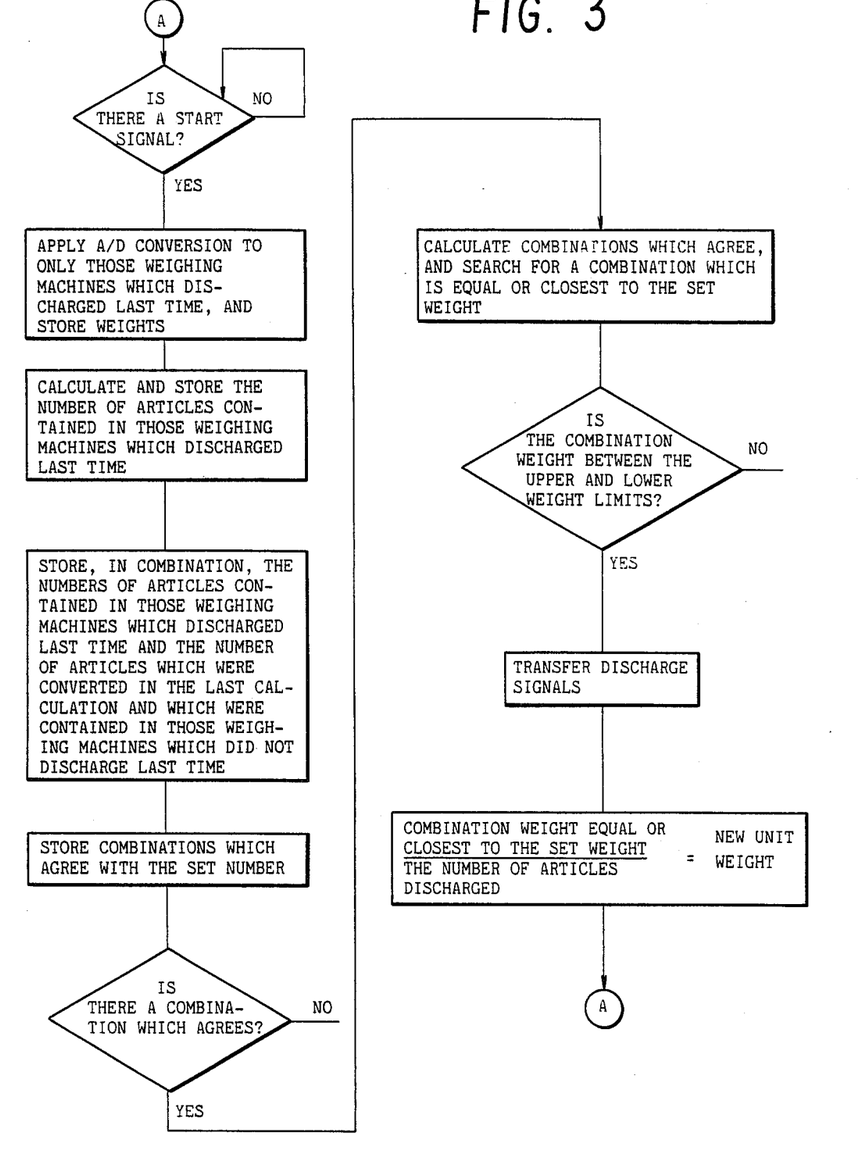

Operation in which the eleventh method of finding new unit weights is performed in the arrangement shown in FIG. 1 will now be described with reference to the flowchart of FIG. 3. The difference of the flowchart of FIG. 3 from that of FIG. 2 is in the region extending from the start of calculation of combinations to the point where the arithmetic control section 4 stores those combinations which agree with the set number. This different operation alone will be described. When a start signal a is transferred to the arithmetic control section 4 from a packaging machine (not shown), the arithmetic control section 4 outputs a selection signal b to the multiplexer 2. In accordance with the selection signal b, the multiplexer 2 picks up only those of the weighing machines $1_1 \ldots 1_n$ which discharged last time and successively transfers analog weight voltages to the A/D converter, the A/D converted weights being stored in the arithmetic control section 4. The arithmetic control section 4 divides the stored weights by the unit weight set by the weight setting section 5, rounds the quotients to the nearest integers, and converts the weights of the articles in the weighing machines $1_1 \ldots 1_n$ which discharged last time. In accordance with all of the combination codes, the arithmetic control section 4 calculates combination numbers by performing predetermined addition from the numbers already stored for the weighing machines $1_1 \ldots 1_n$ which discharged last time and the numbers which were converted and stored in the last calculation for the weighing machines which did not discharge last time, and stores these combination numbers and combination codes in pairs. The operation which follows is exactly the same as that described with reference to FIG. 2.

The twelfth method of finding new unit weights will now be described.

The first through eleventh methods of finding new unit weights employ the way of storing a unit weight anew for each combinatorial counting operation. However, it does not necessarily follows that the unit weight is substantially equal for each combinatorial counting operation or is increasing or decreasing in the same direction. For example, if the unit weight repeats increase and decrease for each combinatorial counting operation, it follows that with respect to the unit weight stored anew in a state where it changed in the increasing direction (decreasing direction) in the last combinatorial counting operation, the unit weight of articles which take part in combinatorial counting operation this time is changing in the decreasing direction (increasing direction), i.e., in the opposite direction. In this case, the result is that the unit weight is stored anew in the direction which lowers the accuracy of conversion into numbers. To solve this problem, according to the twelfth method of finding new unit weights, renewal storage of unit weight is not effected each time and instead unit weights obtained in n successive combinatorial counting operations are stored and after the nth time, the average of these n unit weights will be stored for use as a new unit weight for the following n successive combinatorial counting operations. If renewal storage of unit weight is effected every nth time in this manner, the probability of number conversion can be increased.

In addition, the twelfth method of finding new unit weights will be used with any of the first through eleventh methods used in the arrangement shown in FIG. 1 or will be used with any combination of these methods.

Figure 4:
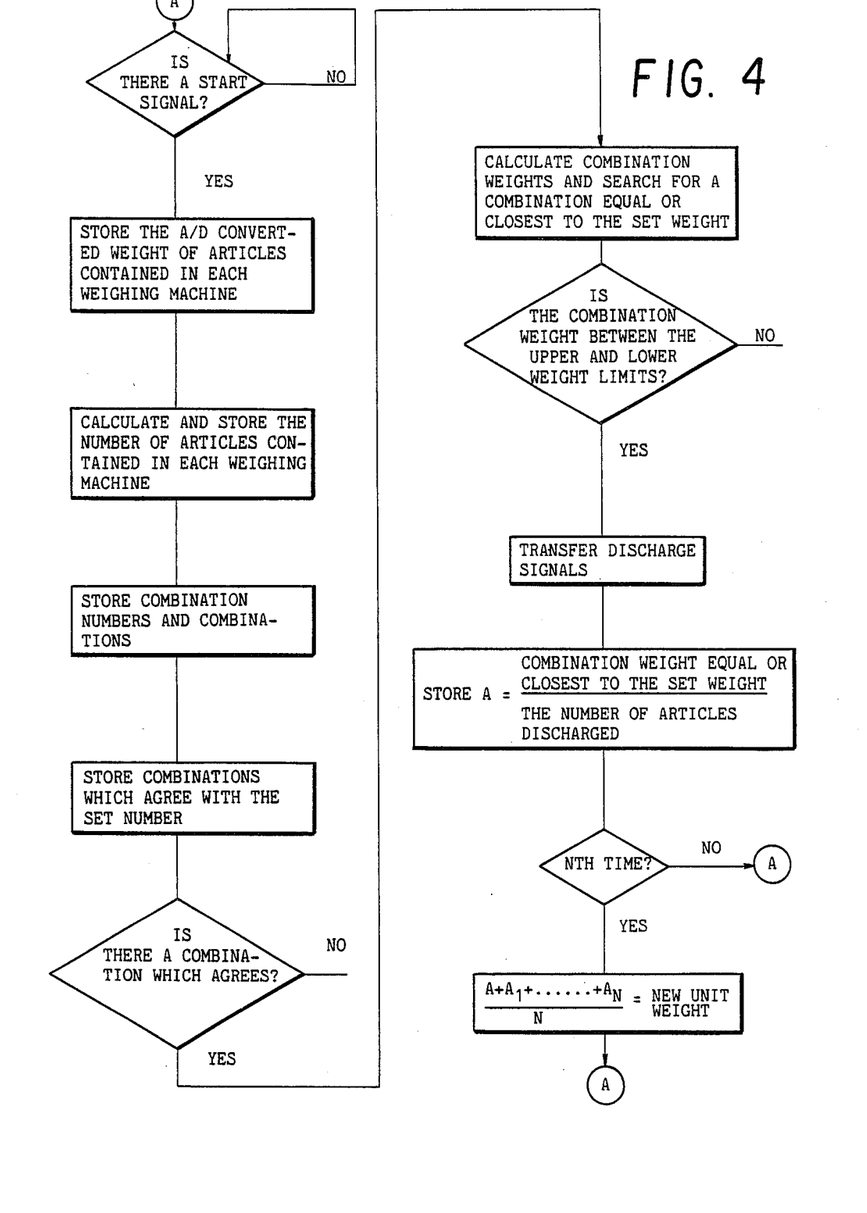

Operation in which the twelfth method of finding new unit weights is performed in the arrangement shown in FIG. 1 will now be described with reference to the flowchart of FIG. 4. The difference of the flowchart of FIG. 4 from that of FIG. 2 is in the region extending from the point where the arithmetic control section 4 transfers discharge signals to weighing machines to the point where it waits for a start signal a from the packaging machine. This different operation alone will be described. When the arithmetic control section 4 outputs a discharge signal, the same number of articles as the set number are discharged from the weighing machines corresponding to the discharge signals. At this time, the arithmetic control section 4 calculates a unit weight (A) by dividing the combination weight, which is equal or closest to the weight of the discharged articles, i.e., the set weight, by the number of discharged articles, i.e., the set number, stores said unit weight (A), and judges whether or not the number of times of calculation of such unit weight (A) reaches the preset number n. If it does not reach the number n, the arithmetic control section waits for a start signal a from the packaging machine, performing the next combinatorial operation in the same procedure as described with reference to the flowchart of FIG. 2. If the number of times of calculation of unit weight (A) reaches the number n, the arithmetic control section adds up the n unit weights (A), which have been stored, and divides the sum by n, to find the average unit weight, which is then used as a new unit weight for the following number conversion. Thus, a new unit weight is calculated every nth time, and the same procedure is repeated.

While the arrangement shown in FIG. 1 is an example in which all of the data to be processed are once converted into digital values, which are then processed by arithmetic operations, it goes without saying that the present invention is also applicable to an arrangement for processing analog values by arithmetic operations.

Figure 5:
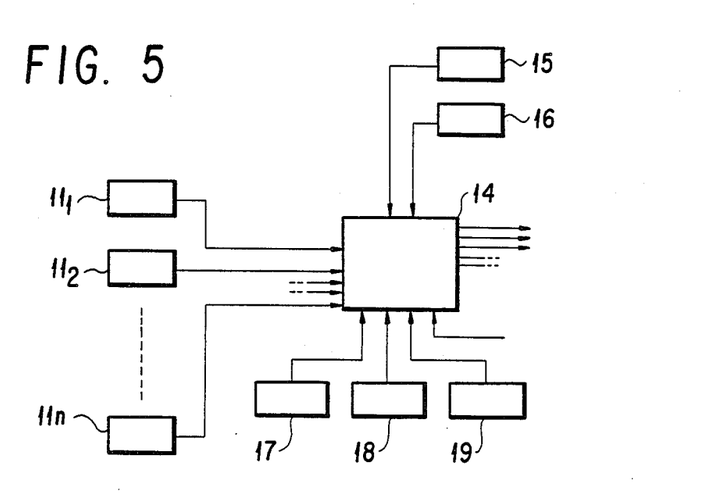
FIG. 5 is a block diagram of another embodiment of the invention.

FIG. 5 shows a system in which analog weight voltages from n weighing machines $11_1 \ldots 11_n$ are transferred to an arithmetic control section 14 through a storage section which stores analog weight voltages. The numeral 15 denotes a unit weight setting section for setting the unit weight of articles by analog voltage; 16 denotes a number setting section for setting by analog voltage the number of articles to be discharged; 17 denotes a weight setting section for setting by analog voltage the total weight of that number of articles which is set by the number setting section 16; 18 denotes an upper weight limit setting section for setting by analog voltage the upper limit of the total weight of a set number of articles; and 19 denotes a lower weight limit setting section for setting by analog voltage the lower limit of the total weight of a set number of articles. When a start signal from a packaging machine (not shown) adapted to package counted articles is transferred to the arithmetic control section 14, combinatorial counting operation is performed in the same manner as described with reference to the arrangement of FIG. 1, and a new unit weight is calculated by any of the first through twelfth methods of finding new unit weights or by any combination thereof.

In addition, in the present invention described above, a combination whose combination number is equal to the set number is found; however, a combination which is closest to the set number may be found. In this case, however, since the combination which is closest to the set number is not always equal to the set number, a new unit weight will be calculated by dividing the combination weight by said closest number.

Further, of the combinations whose combination numbers are equal or closest to the set number, any one combination without regard to the combination weight, e.g., a combination initially found to be equal to the set weight may be used to discharge articles. In this case, therefore, said upper and lower weight limit setting sections and weight setting section are not needed.

Further, in the present invention described above, during combinatorial operation, only that one of the combinations calculated previously whose combination number is equal or closest to the set number is stored, and upon completion of all combinatorial operations, a combination whose combination number is equal or closest to the set number in all combinations may be found.

As many apparently widely different embodiments of this invention may be made without departing from the spirit and scope thereof, it is to be understood that the invention is not limited to the specific embodiments thereof except as defined in the appended claims.

What is claimed is:

1. A method for repetitively packaging a set number of articles within a predetermined weight range, by using a plurality, n, of weighing machines, said method comprising the steps of:

feeding each of said n weighing machines with articles to be packaged;

weighing said articles in each of said n weighing machines;

calculating the number of articles in each weighing machine by dividing the weight measured by each weighing machine by a predetermined unit weight;

calculating combinations of said number of articles in each weighing machine to provide combination numbers;

selecting a preferred combination from said combination numbers, such that the total combination number of articles in said preferred combination is equal or closest to said set number of articles;

further calculating a new unit weight from the weight or weights measured by one or a plurality of said weighing machines and from the number or numbers of articles in said one or plurality of weighing machines, said new unit weight being substituted for said predetermined unit weight in calculating the number of articles in subsequent weighing and calculating operations; and discharging and packaging said articles together from the weighing machines comprising said preferred combination, and returning to said feeding step.

2. The packaging method of claim 1, wherein said new unit weight calculated in said calculating step is determined by dividing the combination weight of articles in the weighing machines of said preferred combination by the number of discharged articles.

3. The packaging method of claim 1, wherein when a plurality of combinations have combination numbers which are each equal to the set number, said new unit weight is calculated by dividing the median of the series of combination weights by the combination number of articles in the corresponding combination.

4. The packaging method of claim 1, wherein when a plurality of combinations have combination numbers which are each equal to the set number, said new unit weight is calculated by dividing each combination weight by the corresponding combination number to find the unit weight for each combination, and further calculating the average of these unit weights to find said new unit weight.

5. The packaging method of claim 1, wherein said step of calculating said new unit weight includes defining an upper and lower limit for the set number, dividing all or any of the combination weights in those combinations which lie between said upper and lower limits respectively by the corresponding combination numbers of articles to find the respective unit weights, calculating the average of these respective unit weights to find said new unit weight.

6. The packaging method of claim 1, wherein said step of calculating said new unit weight includes dividing the combination weights in all combinations respectively by the corresponding combination numbers of articles to find respective unit weights, and calculating the average of these respective weights to find said new unit weight.

7. The packaging method of claim 1, wherein said step of calculating said new unit weight includes dividing the total of the combination weights in all or any combinations by the total of the combination numbers of articles in the corresponding combinations to find said new unit weight.

8. The packaging method of claim 1, wherein said step of calculating said new unit weight includes dividing the weight of articles measured by a particular one of the weighing machines taking part in the combinatorial counting operation by the number of articles in said particular weighing machine to find said new unit weight.

9. The packaging method of claim 1, wherein said step of calculating said new unit weight includes calculating said new unit weight by selecting in sequence one of the weighing machines taking part for each combinatorial counting operation, said sequence having a predetermined order, and dividing the weight of the articles measured by said selected weighing machine by the number of articles in said selected weighing machine.

10. The packaging method of claim 1, wherein said step of calculating said new unit weight includes dividing the weights of articles weighed by all or any of the weighing machines taking part in the combinatorial counting operation respectively by the numbers of articles in the corresponding weighing machines to find respective unit weights, and calculating the average of these respective unit weights, to find said new unit weight.

11. The packaging method of claim 1, wherein said step of calculating said new unit weight includes adding up the weights of articles weighed by all or any of the weighing machines taking part in combinatorial counting operation to find a total weight, adding up the numbers of articles in the corresponding weighing machines to find a total number, and dividing the calculated total weight by the calculated total number to provide said new unit weight.

12. The packaging method of any one of claims 1 through 11, wherein after said discharge and packaging step, the numbers of articles in those weighing machines which were not in said preferred combination and thus have not discharged articles are stored, and the recalculation of the numbers of articles by dividing the weights of articles by said new unit weight is performed only for the weighing machines which discharged articles in the previous combinatorial operation.

13. the packaging method of any one of claims 1 through 11, wherein said new unit weight to be used for combinatorial counting is renewed every nth combinatorial counting operation, such that new unit weights to be obtained each time a combinatorial counting operation is performed are stored each time throughout n such operations, and each time unit weights corresponding to n operations are obtained, an average value thereof is calculated for use as said new unit weight for the following n combinatorial counting operations.

14. The packaging method of any one of claims 1 through 11, wherein during combinatorial counting, weights, combination weights and unit weights are processed in analog quantities.

* * * * *